UNITED STATES PATENT OFFICE.

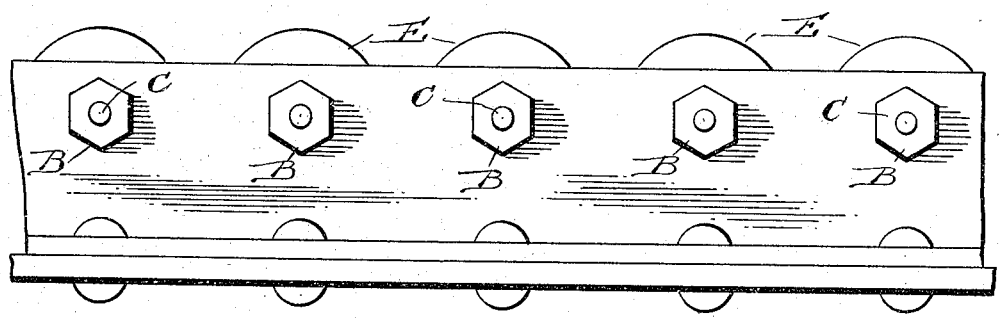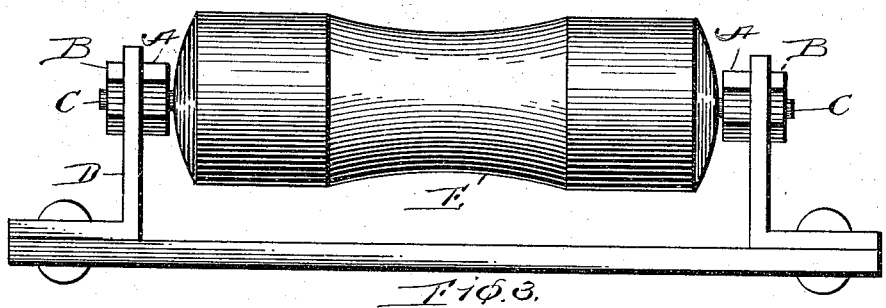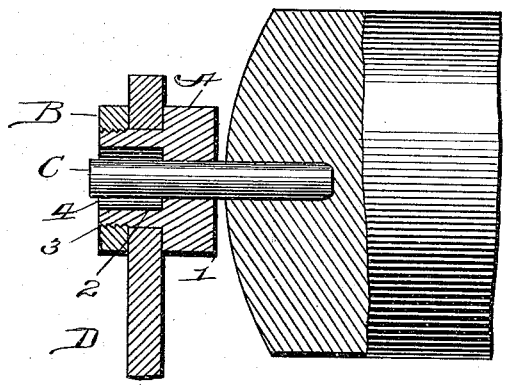

MORRIS U. BERNHEIM, OF LOUISVILLE, KENTUCKY, ASSIGNOR, BY MESNE ASSIGNMENTS, TO THE ALVEY-FERGUSON COMPANY, OF OAKLEY, CINCINNATI, OHIO, A CORPORATION OF OHIO.

BEARING FOR SHAFTS.

1,147,136. Specification of Letters Patent. Patented July 20, 1915.

Application filed May 2, 1910. Serial No. 558,784.

*To all whom it may concern:*

Be it known that I, MORRIS U. BERNHEIM, a citizen of the United States, residing at Louisville, in the county of Jefferson and State of Kentucky, have invented new and useful Improvements in Bearings for Shafts, of which the following is a specification.

This invention relates to certain improvements in bearings for shafts and analogous objects, and its special purpose is to provide a bearing of most simple and durable construction which will satisfactorily answer conditions peculiar to certain special classes of machinery, such for example, as gravity conveyers of the type whereof the beds are formed, in whole or in part, of rollers. It frequently is found necessary in this class of machinery to dispose the conveyer at a grade of from one-half inch to one inch per foot, for example, at which grade provision must be made for a certain amount of frictional resistance to the rotation of the rollers in the bed of the conveyer, greater than that which would occur if the rollers were mounted upon rotative bearing elements. Moreover, in this type of machinery, two longitudinally extending frame elements carry between them a series of rollers, which are spaced, ordinarily, about six inches apart from center to center, and extend transversely of the conveyer from one frame element to the other and are supported by the latter. In view of the great number of bearings which, therefore, must be provided even in a conveyer of very ordinary length, the cost of each bearing is an item calling for important consideration. Again, special consideration must be given to the operativeness of the rollers, for reliance is placed upon them automatically to feed packages by their rotative movements against the packages, under the influence of gravity in the particular type of conveyers hereinbefore referred to, and if any of them either run too freely or not freely enough, or is not in proper alinement with others, by reason of an improper bearing, or one which is worn, the proper operation of the machine is interfered with. This makes it desirable to provide a bearing which among others of its capabilities can be readily replaced when it is worn or improperly fitted to its shaft. These are among the important special considerations which I have answered by my present invention, my object being to provide a bearing for shafts and analogous objects, which will be simple and inexpensive in its construction, and can be readily and easily applied to its support and removed therefrom, for purpose of renewal or for any other purpose: and to this end the invention consists in certain peculiarities in the construction and arrangement of parts and in certain novel combinations of elements substantially as hereinafter described and particularly pointed out in the subjoined claims.

In the accompanying drawings illustrating the invention Figure 1 is a side elevation of a support provided with a line of the present bearings, in condition for shipment. Fig. 2 is an end view of a gravity conveyer embodying my improvements. Fig. 3 is a sectional view of the bearing, showing the contiguous end of a roller supported thereby.

Similar characters of reference designate corresponding parts in the several views.

The bearing is composed of a hollow member A and a member B. The member comprises a head 1 and a stem 2, and the opening for the reception of the shaft C which it is to sustain preferably extends throughout its entire length, as clearly shown in Fig. 3. Its stem 2 is externally threaded, as seen at 3, to engage and hold the member B. The correlation of the parts is such that the stem 2 will be adapted to extend through a suitable aperture in the support D, while the head 1 will engage one surface of said support and the member B will engage the opposite surface of the support. This member B forms a clamping nut by which the bearing is drawn to its place and, assisted by the head 1, held against accidental movement. To provide the proper amount of friction, the diameter of the opening 4 through the bearing is greater at one or more places in its length than that of the shaft C, the latter in the illustrated embodiment finding its bearing against the wall of the opening through the head 1, which opening is of substantially the same diameter as said shaft, while the stem 2 is counterbored so that its internal wall will be free from contact with the shaft C throughout its length. A bearing thus constructed answers all the conditions before noted. Being more especially intended for use in conveyers having rollers in the bed thereof, of which gravity conveyers is an example, it is herein exemplified in such embodiment, without intending, however, to be thereby understood as restricting it to this use only.

The particular support D herein illustrated is one of the side members of the frame of such a conveyer, said frame comprising two such members, and suitable supporting and bracing means therefor, not necessary particularly to illustrate or describe herein. These side members are each provided at intervals with apertures through which the stems of the bearings severally extend and said bearings are clamped against the side surfaces of the respective side members in the manner already set forth. The shafts C illustrated project from the ends of freely rotatable rollers E which form the bed of the conveyer. When this bed extends at a downward inclination, packages placed thereon are automatically moved from one end to the other, with perfect safety thereto, under the influence of gravity. In some of these machines, the frame and bed is disposed on a level and in others they are arranged at an upward inclination, in which event power is employed to propel the packages over the bed, and I am aware that the present bearing may be useful in such machines, and in fact, in other classes of machinery than conveyers, where conditions may be presented which can be satisfactorily answered by a bearing of the present character.

Mention may be made of the fact that for gravity conveyers which are to be operated on grades of from one-half inch to one inch per foot the length of that portion of the opening whose wall is in contact with the shaft C is approximately three-eighths of an inch. This gives sufficient supporting surface to the axle of the roller and the remainder of the bearing is counterbored so that the shaft will not come in contact with the metal of the bearing and create undue friction. It will be noted that this bearing accomplishes the purposes stated and also overcomes the disadvantages incident to merely providing an aperture in the frame for the axle, among which disadvantages may be mentioned the fact that the metal of the frame is not always of the same hardness and some of the apertures wear more than others, requiring in such case replacement of the entire side member. Preferably the shafts C are removably driven into the ends of the rollers E to facilitate assemblage and disassemblage of the parts.

Having now described my invention what I believe to be new and desire to secure by Letters Patent, is:

1. A bearing for the shaft of a conveyer-roller, the said bearing being formed of two members the first of which is provided with a stem arranged to extend through an aperture in a support and a head to engage a side of the support, and the second of which members is mounted on said stem and arranged to engage the other side of the support, said first member being an integral structure and having a longitudinal shaft-opening in its stem and head, and which opening for substantially half of its length is of substantially the diameter of the shaft, so as to engage the latter and form a bearing therefor, and for the remainder of its length is of greater diameter than the shaft so as to be out of contact therewith.

2. A bearing for the shaft of a conveyer-roller, the said bearing having two members, one of said members being provided with a part arranged to extend through an aperture in a support, the said part having a longitudinal opening whose inner wall is integral throughout, said opening being of greater diameter than the shaft for a substantial portion of its length and being of substantially the same diameter as the shaft for the remainder of its length, the said part also having at one end an outwardly extending portion to engage the adjacent side of the support, the other of said members being mounted on the other end of the first member and arranged to engage the adjacent side of the support.

3. A roller disposed in an approximately horizontal plane and having shafts at opposite ends, supports having apertures and bearings for said shafts, arranged in said apertures, each of said bearings being formed of two members, one of which members is provided with a stem adapted to extend through the aperture in the adjacent support and a head to engage the side of the latter and the other of which members is adjustably mounted on said stem and adapted to engage the other side of said support, the first-mentioned member also having an opening for the adjacent shaft and said opening being of greater diameter in one part of its length than in another part thereof, the portion of lesser diameter being of substantially the diameter of the shaft and engaging the latter, and the portion of greater diameter being devoid of elements or surfaces which engage said shaft, whereby the portion of the shaft within the greater diameter of the opening is free from contact with an element affording frictional resistance to the rotation thereof.

In testimony whereof I have hereunto set my hand in presence of two subscribing witnesses:

MORRIS U. BERNHEIM.

Witnesses:
B. H. ALVEY,
GEO. D. HEYWARD.

Copies of this patent may be obtained for five cents each, by addressing the "Commissioner of Patents, Washington, D. C."